United States Patent
He

(10) Patent No.: US 10,653,074 B2
(45) Date of Patent: May 19, 2020

(54) FLOWERPOT MADE OF WASTE TIRES AND PREPARING METHOD THEREOF

(71) Applicant: Xinqiao He, Guangdong (CN)

(72) Inventor: Xinqiao He, Guangdong (CN)

( * ) Notice: Subject to any disclaimer, the term of this patent is extended or adjusted under 35 U.S.C. 154(b) by 322 days.

(21) Appl. No.: 15/588,668

(22) Filed: May 7, 2017

(65) Prior Publication Data

US 2017/0332560 A1    Nov. 23, 2017

(30) Foreign Application Priority Data

Mar. 28, 2017    (CN) .......................... 2017 1 0190387

(51) Int. Cl.
*A01G 9/02* (2018.01)

(52) U.S. Cl.
CPC ............... *A01G 9/02* (2013.01); *A01G 9/023* (2013.01)

(58) Field of Classification Search
CPC .......... A01G 9/02; A01G 9/023; A01G 9/025; A01G 9/022; A01G 9/0291
USPC ......................................... 47/65.7, 66.1, 66.6
See application file for complete search history.

(56) References Cited

U.S. PATENT DOCUMENTS

| | | | | |
|---|---|---|---|---|
| 3,728,749 A * | 4/1973 | Eby | ........................... | B63B 5/24 114/267 |
| 3,951,384 A * | 4/1976 | Hildreth, Jr. | .......... | E01F 15/003 256/1 |
| 4,785,577 A * | 11/1988 | Lederbauer | ............. | E01F 8/023 256/13.1 |
| 5,013,509 A * | 5/1991 | Kiselewski | ............... | E02B 3/04 264/112 |
| 5,213,058 A * | 5/1993 | Parker | .................... | A01K 61/70 119/208 |
| 5,236,756 A * | 8/1993 | Halliburton | ............. | E01F 5/005 156/95 |
| 5,238,228 A * | 8/1993 | Moon | ................... | E01F 15/145 256/1 |
| 5,479,882 A * | 1/1996 | Kerner | ..................... | A01K 5/01 119/61.1 |
| 5,645,371 A * | 7/1997 | Marzullo | ................. | E02B 3/06 405/15 |
| 6,042,300 A * | 3/2000 | Walter | ................... | A01K 61/70 405/29 |
| 6,604,888 B2 * | 8/2003 | Dolan | ................... | E01F 15/146 404/10 |
| 6,712,024 B1 * | 3/2004 | Hall | ....................... | A01K 61/70 119/222 |

(Continued)

FOREIGN PATENT DOCUMENTS

DE    3718288 A1 * 12/1988  ............... A01G 9/02

*Primary Examiner* — Ebony E Evans

(57) ABSTRACT

A flowerpot made of waste tires, includes: a suspended tire, a circular bottom plate, a hose clamp, a fixed disk and a supporting tube; wherein the fixed disk is fixed on a ground, the supporting tube is set up from a center of the fixed disk, the circular bottom plate has through holes for matching with the supporting tube; the suspended tire, the circular bottom plate and the hose clamp pass through the supporting tube, and the hose clamp tightly clamps a top portion of the supporting tube on the circular plate without any slip; the suspended tire is provided above the circular plate; the suspended tire, the circular bottom plate and the hose clamp form a flowerpot body structure suspended on the supporting tube; the suspended tire is filled with soil for planting plants.

7 Claims, 1 Drawing Sheet

(56) References Cited

U.S. PATENT DOCUMENTS 9,228,310 B2 * 1/2016 Goei .................. B29B 17/00
9,918,451 B2 * 3/2018 Graves ................ A01K 5/01

* cited by examiner

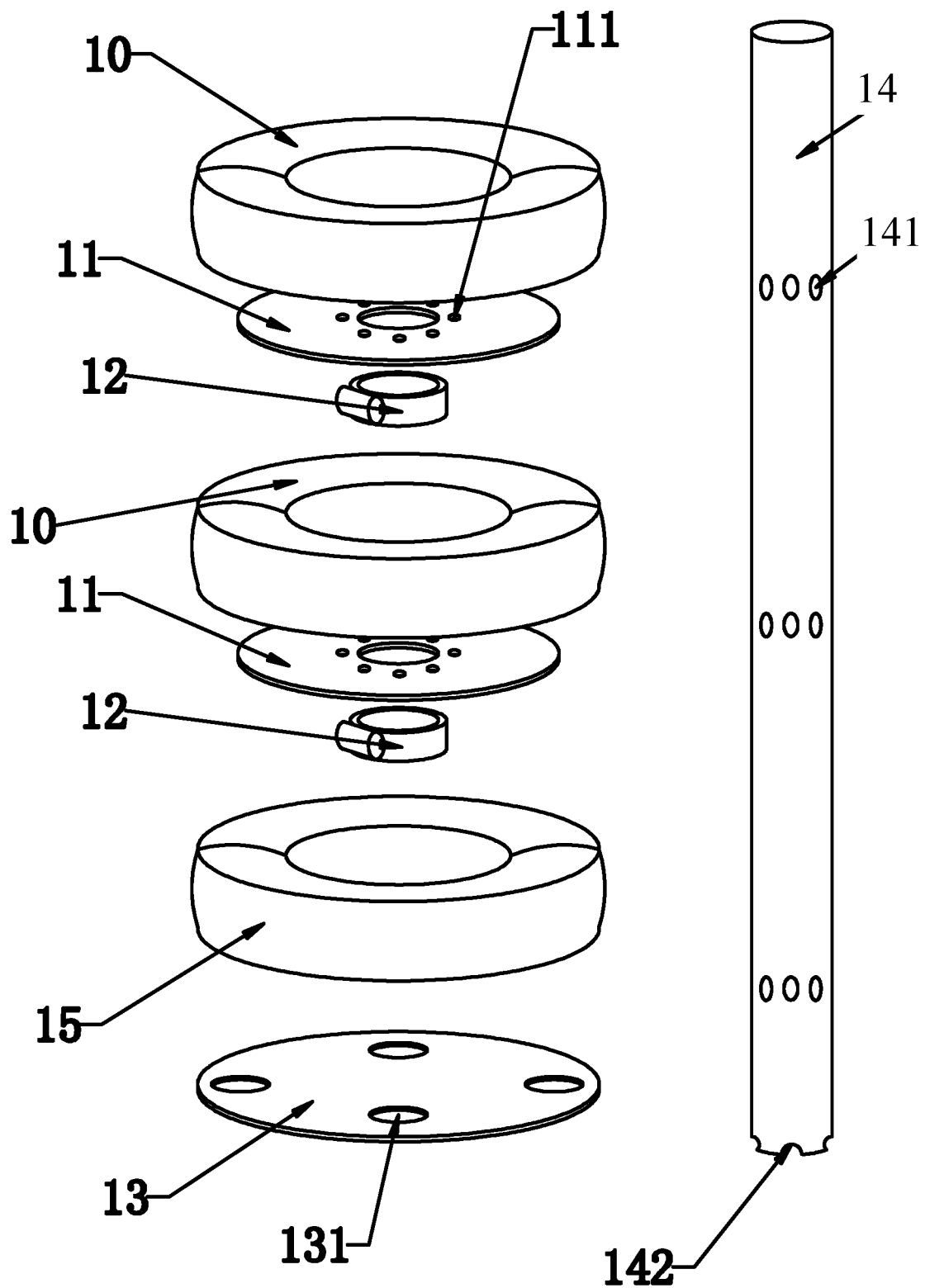

FLOWERPOT MADE OF WASTE TIRES AND PREPARING METHOD THEREOF

CROSS REFERENCE OF RELATED APPLICATION

The present application claims priority under 35 U.S.C. 119(a-d) to CN 201710190387.5, filed Mar. 28, 2017.

BACKGROUND OF THE PRESENT INVENTION

Field of Invention

The present invention relates to a flowerpot made of waste tires and a preparing method thereof, which belongs to the technical field of building materials.

Description of Related Arts

Currently, most of the on-market flower pots for beautifying the environment are made of materials of ceramics, glasses, plastics, bamboo, stainless steel and other materials. These materials have good effects, but also is fragile, resource wasting and energy consuming which are disadvantages. Auto tires are made of steel and rubber, and basically abandoned after wearing. Because the auto tires have steel wire, the crushing cost thereof is very high and the waste tires are everywhere, which has a bad effect on the city appearances. Rubber has a good anti-aging performance and a low cost. The recycling cost of waste tires is higher than the original manufacture cost. Particularly, the waste auto tires almost have no recycling value. The present invention prepares flower pots utilizing waste tires, so as to achieve the object of utilizing waste, reducing the production of ceramics, glasses, plastics, bamboo and stainless steel flower pots. The flower pots provided by the present invention has a long service life and has a practical value of energy saving and thus is of far-reaching significance.

SUMMARY OF THE PRESENT INVENTION

In view of the problems mentioned above, the present invention provides a flowerpot made of waste tires and a preparing method thereof, which is not only capable of making good use of waste materials but also beautifying the environment. Accordingly, In order to achieve the objects above, the present invention adopts following technical solutions:

A flowerpot made of waste tires, comprising: a suspended tire, a circular bottom plate, a hose clamp, a fixed disk and a supporting tube; wherein the fixed disk is fixed on a ground, the supporting tube is set up from a center of the fixed disk, the circular bottom plate has through holes for matching with the supporting tube; the suspended tire, the circular bottom plate and the hose clamp pass through the supporting tube, and the hose clamp tightly clamps a top portion of the supporting tube on the circular plate without any slip; the suspended tire is provided above the circular plate; the suspended tire, the circular bottom plate and the hose clamp form a flowerpot body structure suspended on the supporting tube; the suspended tire is filled with soil for planting plants; a plurality of breathing holes are provided on the circular bottom plate to facilitate growth of roots of the plants; and side holes for facilitating irrigation are provided on a position where the supporting tube is contacted with the suspended tire.

Preferably, the flowerpot made of waste tires further comprises: a bottom tire; wherein the bottom tire is provided on the fixed disk, screw holes for matching with screw structures are opened on four corners of the fixing disk, the fixed disk is detachably and fixedly connected with a ground by the screw structure, a bottom end of the supporting tube is fixed by welding on the fixed disk, a plurality of slots are opened on a bottom end of the supporting tube.

Preferably, both the bottom tire and the suspended tire are non-recyclable waste tires; wherein the supporting tube is a galvanized water pipe, and the circular bottom plate is a waste PVC advertising plate.

Preferably, multiple groups of flowerpot body structures are vertically suspended on the supporting tube; wherein an external diameter of the circular bottom plate in each of the groups of flowerpot body structures is greater than an internal diameter of the suspended tire and smaller than an external diameter of the suspended tire; external diameters of the multiple groups of the suspended tires are constant or decrease by degrees from a bottom up.

The present invention provides a flowerpot made of waste tires, comprising: a suspended tire, a circular bottom plate, a receiving frame and a bearing hook nail; wherein the circular bottom plate is provided on an internal surface of a bottom of the receiving frame; the suspended tire is provided on the circular bottom plate, wherein the bearing hook nail and the receiving frame are an integrally formed body; the bearing hook nail is tightly locked in an expansion screw of an external wall; the suspended tire, the circular bottom plate, the bearing hook nail and the receiving frame are combined to form a plug-in flowerpot structure.

Preferably, the suspended tires are all waste tires which are not capable of recycling and utilizing, and the circular bottom plate is a discarded PVC advertising plate.

The present invention provides a method for preparing the flowerpot made of waste tires comprises steps of:

fixing a supporting tube on a fixed disk, wherein the fixed disk is fixed on a ground;

inserting a supporting tube in a bottom tire and fixing;

sleeving a hose clamp, so as to be fixedly locked on the supporting tube;

sleeving a circular bottom plate on the hose clamp;

inserting the supporting tube into a suspended tire, and providing the suspended tire on the circular bottom plate, so as to form a vertical flowerpot structure;

sleeving a next group of hose clamp, and sleeving the circular bottom plate, providing the suspended tire on the circular bottom plate to form a next group of vertical suspended flowerpot structure;

sleeving sufficient vertical suspended flowerpot structures according to a length of the supporting tube;

filling the suspended tires with soil and planting plants.

Preferably, both the bottom tire and the suspended tire are non-recyclable waste tires; wherein the supporting tube is a galvanized water pipe, the circular bottom plate is a waste PVC advertising plate.

Preferably, waste tires are firstly cleaned and then dried by natural air; desired colors are sprayed on a periphery with high-temperature pigment, and then the waste tires are baked at a temperature of 120° C. for 15 minutes, so as to form colored bottom tires or the suspended tire, and structure of the flowerpot is manufactured afterwards.

The present invention provides a method for preparing the flowerpot made of waste tires comprises steps of:

providing a circular plate on a bottom of an internal surface of a receiving frame;

providing a suspended tire 10 in the circular bottom plate;

wherein the bearing hook nail and the receiving frame are an integrally formed body; the bearing hook nail is tightly locked in an expansion screw of an external wall; the suspended tire, the circular bottom plate, the bearing hook nail and the receiving frame are combined to form a plug-in flowerpot structure.

Compared with the conventional arts, the present invention adopts the flowerpot body structure suspended on the supporting tube, which is formed by the suspended tire, the circular bottom plate and the hose clamp. The flowerpot body has a simple structure. The present invention achieves manufacturing a flowerpot which is not only capable of utilizing waste materials but also beautifying the environment; and meanwhile reducing the production of flowerpots made of ceramics, glasses, plastics, bamboo and stainless steel. The present invention indirectly protects the environments and has the effects of energy conservation.

These and other objectives, features, and advantages of the present invention will become apparent from the following detailed description, the accompanying drawings, and the appended claims.

BRIEF DESCRIPTION OF THE DRAWINGS

FIG. 1 is an exploded view of a flowerpot made of waste tire according to a preferred embodiment of the present invention.

Reference numbers of main elements are as follows.
10—suspended tire; 11—circular bottom plate; 12—hose clamp; 13—fixed disk; 14—supporting tube; 15—bottom tire; 111—breathing hole; 131—screw hole; 141—side hole; 142—slot.

DETAILED DESCRIPTION OF THE PREFERRED EMBODIMENT

Further description of the present invention is illustrated combining with the drawings and the preferred embodiments in detail as follows.

Referring to FIG. 1, the present invention provides a flowerpot made of waste tires comprising: a suspended tire 10, a circular bottom plate 11, a hose clamp 12, a fixed disk 13 and a supporting tube 14; wherein the fixed disk 13 is fixed on a ground, the supporting tube 14 is set up from a center of the fixed disk 13, the circular bottom plate 11 has through holes for matching with the supporting tube 14; both the circular bottom plate 11 and the hose clamp 12 pass through the supporting tube 14, and the hose clamp 12 tightly clamps the supporting tube 14 on the circular plate 11 without any slip; the suspended tire 10 is provided above the circular plate 11; the suspended tire 10, the circular bottom plate 11 and the hose clamp 12 form a flowerpot body structure suspended on the supporting tube 14; the suspended tire 10 is filled with soil for planting plants; a plurality of breathing holes 111 are provided on the circular bottom plate to facilitate growth of roots of the plants; and side holes 141 for facilitating irrigation are provided on a position where the supporting tube 14 is contacted with the suspended tire 10.

Compared with the conventional arts, the present invention adopts the flowerpot body structure suspended on the supporting tube 14, which is formed by the suspended tire 10, the circular bottom plate 11 and the hose clamp 12. The flowerpot body has a simple structure. The present invention achieves manufacturing a flowerpot which is not only capable of utilizing waste materials but also beautifying the environment; and meanwhile reducing the production of flowerpots made of ceramics, glasses, plastics, bamboo and stainless steel. The present invention indirectly protects the environments and has the effects of energy conservation.

In the preferred embodiment, the flowerpot made of waste tire further comprises a bottom tire 15; wherein the bottom tire 15 is provided on the fixed disk, screw holes 131 for matching with screw structures are opened on four corners of the fixing disk 13, the fixed disk is detachably and fixedly connected with a ground by the screw structure, a bottom end of the supporting tube 14 is fixed by welding on the fixed disk, a plurality of slots 142 are opened on a bottom end of the supporting tube 14, so as to facilitate irrigation; wherein installation of the slots 142 facilitates discharge of water in a water pipe, so as to avoid affecting normal usage of the water pipe or pouring redundant water into the flowerpot and causing root rot.

In the preferred embodiment, both the bottom tire 15 and the suspended tire are non-recyclable waste tires; wherein the supporting tube 14 is a galvanized water pipe, the circular bottom plate 11 is a waste PVC advertising plate. Both the bottom tire 15 and the circular bottom plate 11 of the present invention utilizes waste products, which not only reduces costs but also facilitates recycling of waste materials, and achieves using the waste materials in a high quality.

In the present invention, multiple groups of flowerpot body structures are vertically suspended on the supporting tube 14; wherein an external diameter of the circular bottom plate 11 in each of the groups of flowerpot body structures is greater than an internal diameter of the suspended tire 10 and smaller than an external diameter of the suspended tire 10; external diameters of the multiple groups of the suspended tires 10 are constant or decrease by degrees from a bottom up. The flowerpot body structure not only is a flowerpot, but also belongs to a product for beautifying the environment; wherein different settings are capable of presenting different visual experiences, which are all belong to the protection scope of the present invention.

In the preferred embodiment, a method for preparing the flowerpot made of waste tires comprises steps of:

fixing a supporting tube 14 on a fixed disk 13, wherein the fixed disk is fixed on a ground;

inserting a supporting tube 14 in a bottom tire 15 and fixing;

sleeving a hose clamp 12, so as to be fixedly locked on the supporting tube 14;

sleeving a circular bottom plate 11 on the hose clamp 12;

inserting the supporting tube into a suspended tire, and providing the suspended tire on the circular bottom plate 11, so as to form a vertical flowerpot structure;

sleeving a next group of hose clamp 12, and sleeving the circular bottom plate, providing the suspended tire on the circular bottom plate 11 to form a next group of vertical suspended flowerpot structure;

sleeving sufficient vertical suspended flowerpot structures according to a length of the supporting tube 14;

filling the suspended tires with soil and planting plants.

In the preferred embodiment of the present invention, waste tires are firstly cleaned and then dried by natural air. Desired colors are sprayed on a periphery with high-temperature pigment, and then the waste tires are baked at a temperature of 120° C. for 15 minutes, so as to form colored bottom tires 15 or the suspended tire 10. And structure of the flowerpot is manufactured afterwards.

The present invention further provides a second flowerpot made of waste tires, comprising: a suspended tire 10, a circular bottom plate 11, a receiving frame and a bearing hook nail; wherein the circular bottom plate 11 is provided on an internal surface of a bottom of the receiving frame; the suspended tire 10 is provided on the circular bottom plate 11, wherein the bearing hook nail and the receiving frame are an integrally formed body; the bearing hook nail is tightly locked in an expansion screw of an external wall; the suspended tire 10, the circular bottom plate 11, the bearing hook nail and the receiving frame are combined to form a plug-in flowerpot structure.

In the preferred embodiment, the suspended tires 10 are all waste tires which are not capable of recycling and utilizing, and the circular bottom plate 11 is a discarded PVC advertising plate.

In the preferred embodiment, a preparing method for the flowerpot made of waste tires is provided, comprising steps of:

providing a circular plate 11 on a bottom of an internal surface of a receiving frame;

providing a suspended tire 10 in the circular bottom plate 11;

wherein the bearing hook nail and the receiving frame are an integrally formed body; the bearing hook nail is tightly locked in an expansion screw of an external wall; the suspended tire 10, the circular bottom plate 11, the bearing hook nail and the receiving frame are combined to form a plug-in flowerpot structure.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A flowerpot made of waste tires, comprising: a suspended tire, a circular bottom plate, a hose clamp, a fixed disk and a supporting tube; wherein the fixed disk is fixed on a ground, the supporting tube is set up from a center of the fixed disk, the circular bottom plate has a through hole for passing through the supporting tube; the suspended tire, the circular bottom plate and the hose clamp are passed through by the supporting tube, wherein the hose clamp is sleeved on the supporting tube, so as to be fixedly locked on the supporting tube, the hose clamp tightly clamps a top portion of the supporting tube on the circular bottom plate without any slip; the suspended tire is provided above the circular plate; the suspended tire, the circular bottom plate and the hose clamp form a flowerpot body structure suspended on the supporting tube; the suspended tire is filled with soil for planting plants; a plurality of breathing holes are provided on the circular bottom plate to facilitate growth of roots of the plants; and side holes for facilitating irrigation are provided on a position of the supporting tube where the supporting tube is contacted with the suspended tire.

2. The flowerpot made of waste tires, as recited in claim 1, further comprising: a bottom tire; wherein the bottom tire is provided on the fixed disk, a bottom end of the supporting tube is fixed on the fixed disk, a plurality of slots are opened on a bottom end of the supporting tube.

3. The flowerpot made of waste tires, as recited in claim 2, wherein both the bottom tire and the suspended tire are non-recyclable waste tires; wherein the supporting tube is a galvanized water pipe, and the circular bottom plate is a waste PVC advertising plate.

4. The flowerpot made of waste tires, as recited in claim 1, wherein multiple groups of flowerpot body structures are vertically suspended on the supporting tube; wherein an external diameter of the circular bottom plate in each of the groups of flowerpot body structures is greater than an internal diameter of the suspended tire and smaller than an external diameter of the suspended tire; external diameters of the multiple groups of the suspended tires are constant or decrease by degrees from a bottom up.

5. A method for preparing the flowerpot made of waste tires comprises steps of:

fixing a supporting tube on a fixed disk, wherein the fixed disk is fixed on a ground;

inserting the supporting tube in a bottom tire and fixing;

sleeving a hose clamp, so as to be fixedly locked on the supporting tube;

sleeving a circular bottom plate on the hose clamp;

inserting the supporting tube into a suspended tire, and providing the suspended tire on the circular bottom plate, so as to form a vertical flowerpot structure;

sleeving a next group of hose clamp, and sleeving the circular bottom plate, providing the suspended tire on the circular bottom plate to form a next group of vertical suspended flowerpot structure;

sleeving sufficient vertical suspended flowerpot structures according to a length of the supporting tube;

filling the suspended tires with soil and planting plants.

6. The method for preparing the flowerpot made of waste tires, as recited in claim 5, wherein both the bottom tire and the suspended tire are non-recyclable waste tires; wherein the supporting tube is a galvanized water pipe, the circular bottom plate is a waste PVC advertising plate.

7. The method for preparing the flowerpot made of waste tires, as recited in claim 6, wherein waste tires are firstly cleaned and then dried by natural air; desired colors are sprayed on a periphery with high-temperature pigment, and then the waste tires are baked at a temperature of 120° C. for 15 minutes, so as to form colored bottom tires or the suspended tire, and structure of the flowerpot is manufactured afterwards.

* * * * *